(No Model.) 2 Sheets—Sheet 2.
W. A. McELHINEY.
MEASURING VESSEL.
No. 512,837. Patented Jan. 16, 1894.
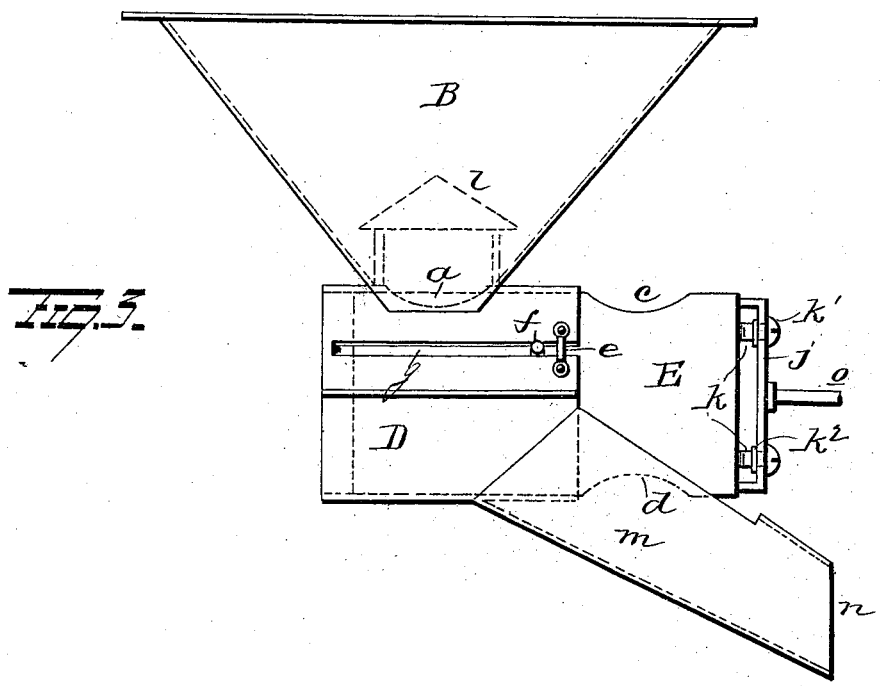
Witnesses
E. Nottingham
G. F. Downing
Inventor
W. A. McElhiney
By H. A. Sugrmon
Attorney

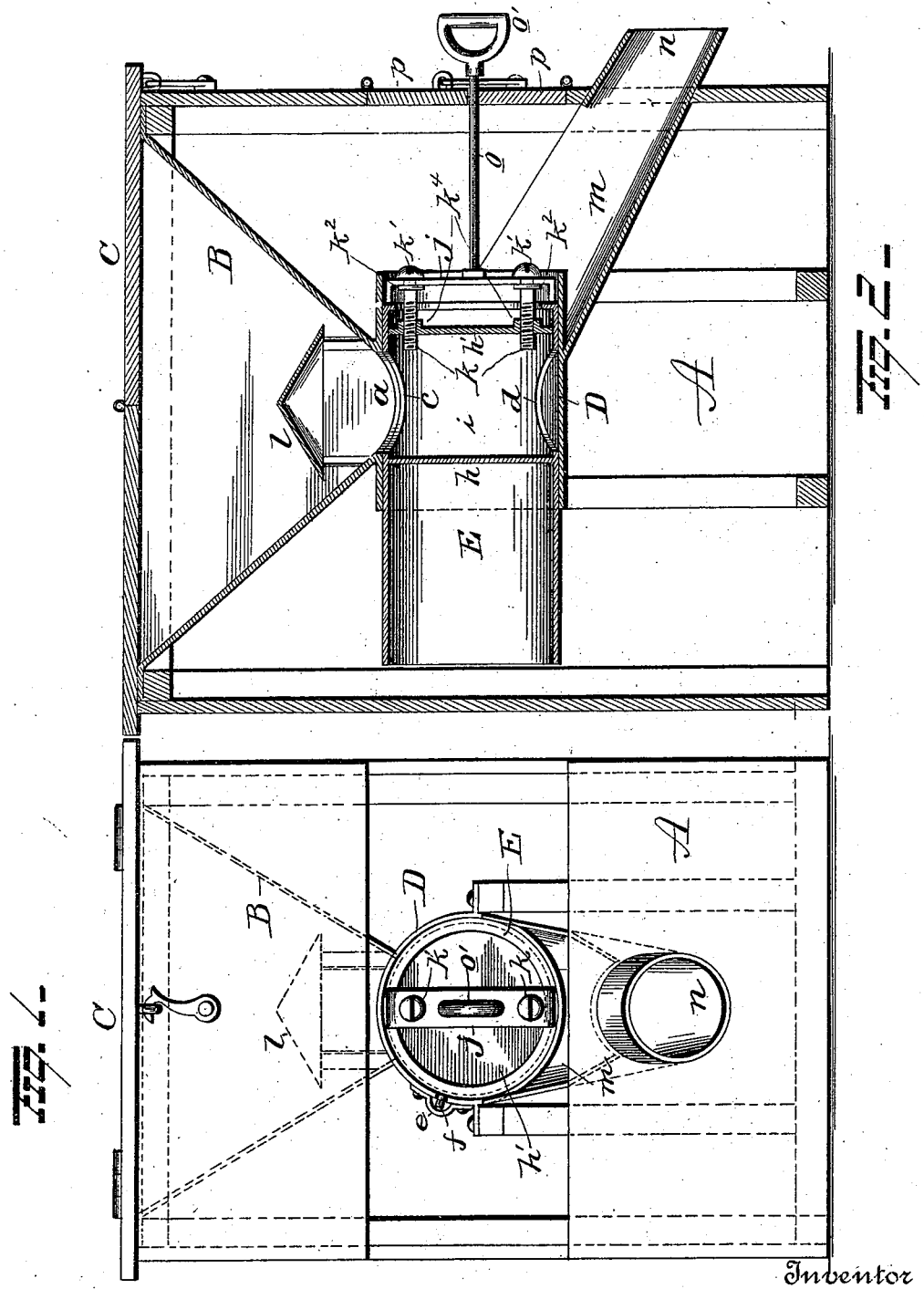

UNITED STATES PATENT OFFICE.

WILLIAM A. McELHINEY, OF BAXTER SPRINGS, KANSAS.

MEASURING-VESSEL.

SPECIFICATION forming part of Letters Patent No. 512,837, dated January 16, 1894.

Application filed May 27, 1893. Serial No. 475,714. (No model.)

*To all whom it may concern:*

Be it known that I, WILLIAM A. McELHINEY, of Baxter Springs, in the county of Cherokee and State of Kansas, have invented certain new and useful Improvements in Measuring Devices; and I do hereby declare the following to be a full, clear, and exact description of the invention, such as will enable others skilled in the art to which it appertains to make and use the same.

My invention relates to an improvement in measuring devices,—and particularly to such as can be used for measuring coffee,—the object of the invention being to produce simple and efficient means for measuring coffee or other material, whereby the use of scales can be dispensed with and the material measured can be made to discharge into a bag or other receptacle.

A further object is to produce a device for the purpose stated which shall be cheap to manufacture, simple in construction, not easy to get out of order and which shall be effectual in the performance of its functions.

With these objects in view the invention consists in certain novel features of construction and combinations and arrangements of parts as hereinafter set forth and pointed out in the claim.

In the accompanying drawings, Figure 1 is a side view with the side of the containing box removed. Fig. 2 is a vertical sectional view. Fig. 3 is a detail view.

A represents a box or casing, in the upper portion of which a hopper B is located for containing a quantity of coffee or other material, said hopper being preferably normally covered by a hinged lid C. Located within the box or casing A beneath the hopper B and communicating with the outlet $a$ of said hopper, is a fixed cylinder or drum D. Within the fixed drum or cylinder D, a longitudinally movable or sliding drum or cylinder E is located and made with aligned openings $c$ and $d$.

The fixed drum or cylinder D is made with an elongated slot $g$ preferably extending nearly the full length thereof, and said slot is prevented from becoming contracted in size, should the inner drum or cylinder be entirely removed, by means of a brace $e$. A pin or lug $f$ projects from the inner drum or cylinder E and into the elongated slot $g$ whereby to prevent said inner drum or cylinder from turning and also to limit the inward sliding movement of said inner drum or cylinder. At a point between the ends of the inner drum or cylinder E, a fixed partition or head $h$ is located therein and constitutes one end of a chamber $i$, the other end of said chamber being formed by a movable head $h'$. A bail $j$ is secured to the drum or cylinder E at the end thereof adjacent to the movable head $h'$, and is provided with perforations for the accommodation of screws $k$, having heads $k'$ adapted to lie parallel with the outer face of the bail and collars or flanges $k^2$ adapted to rest adjacent to the inner face thereof. The screws $k$ enter screwthreaded bosses or enlargements $k^4$ on the movable head $h'$, so that when they are turned said movable head will be moved inwardly or outwardly. The chamber $i$ is preferably of a size to contain a little more than a specified amount of coffee or other material,—say for example, one pound, and by adjusting the movable head $h'$, can be made to hold exactly that amount,—but it frequently occurs that some coffee is more bulky than other grades; hence the necessity for regulating the size of the chamber $i$.

When the inner drum or cylinder E is in its normal position the upper opening $c$ is in alignment with the outlet $a$ of the hopper, and the lower opening $d$ is closed by the under portion of the fixed drum or cylinder D and the coffee from the hopper C will run into the chamber $i$, the pressure of the coffee being equalized by means of a cap $l$ located within the hopper over the outlet opening $a$, so that no more coffee will be forced into the chamber $i$ when the hopper is full than when it is nearly empty. A diagonally disposed trough $m$ communicates at one end with the drum or cylinder D, and at the other end terminates in an outlet spout $n$, which projects through the front of the box A. A rod $o$ is secured at one end to the bail $j$ at the end of the movable or inner drum or cylinder E and projects beyond the front of the box A, where it is provided with a loop $o'$.

The front of the box A is preferably provided with hinged doors $p$, $p$, whereby access may be had to the interior of the box when it is desired to repair any of the parts or remove the drum or cylinder E for adjustment or other purpose, and when said doors are closed they will be held in such position by means of a suitable hook and one or both will be recessed for the passage of the rod o.

When the chamber i shall have become filled as above explained, and it is desired to deposit its contents into a bag or other receptacle, the latter will be placed at the spout n, and the inner drum or cylinder E pulled forward by means of the rod o,—whereupon, the upper opening c of the drum or cylinder E will move out of alignment with the opening a in the hopper, and the opening d will communicate with the trough m, thus permitting the coffee or other contents of the drum or cylinder to flow through the trough and spout and into the bag or other receptacle.

My improvements are very simple in construction, cheap to manufacture, and are effectual, in every respect, in the performance of their functions.

Various slight changes might be made in the details of construction of my invention without departing from the spirit thereof or limiting its scope, and hence I do not wish to limit myself to the precise details of construction herein set forth, but, Having fully described my invention, what I claim as new, and desire to secure by Letters Patent, is—

The combination with a hopper having an outlet opening in its bottom and a cap located in the hopper whereby a chamber is formed over the opening and beneath the cap, and a fixed drum having a guide recess in the side extending longitudinally thereof, of an inner drum having openings in its top and bottom and means thereon projecting into the recess in the fixed drum to limit the longitudinal movement and prevent rotary movement of the inner drum, a movable false partition in the inner drum, means for setting this partition at different positions, and means whereby to slide this inner drum endwise, substantially as set forth.

In testimony whereof I have signed this specification in the presence of two subscribing witnesses.

WILLIAM A. McELHINEY.

Witnesses:
IRA C. PERKINS,
RUSSELL D. DAVIS.